Oct. 7, 1941.  A. C. DURDIN, JR  2,258,005
POWER TRANSMISSION
Filed Jan. 31, 1938  2 Sheets—Sheet 1

Patented Oct. 7, 1941

2,258,005

UNITED STATES PATENT OFFICE 2,258,005

POWER TRANSMISSION

Augustus C. Durdin, Jr., Chicago, Ill.

Application January 31, 1938, Serial No. 187,970

21 Claims. (Cl. 172—239)

The present invention relates to power transmissions and more specifically to electromechanical transmissions and control therefor whereby a driven shaft may be driven selectively at variable speeds and torques by a drive shaft. The invention, in its broader aspects, is susceptible of many and varied applications, but it is designed particularly for use with automotive vehicles.

It is an object of the present invention to provide an improved multiple speed transmission in which the speed of the driven shaft may be changed at will without the necessity of making any changes in the mechanical connection between the drive and driven shafts.

A further object of the invention is to provide an improved power transmission in which the driven shaft may be selectively driven at a plurality of speeds in both forward and reverse directions without the necessity of making any changes in the mechanical connection between the drive and driven shaft.

A further object of the invention is to provide a power transmission system which is adapted to drive a driven shaft at one speed, and after the speed reaches a predetermined value at a second and higher speed without the necessity of mechanical changes or manual manipulation of controls.

A more specific object of the invention is to provide an improved automatic power transmission system for automotive vehicles wherein the transmission is controlled in a novel manner by means responsive to the vacuum developed by the vehicle engine.

A more specific object is to provide a power transmission comprising a drive and driven shafts interconnected through electromagnetically controlled gearing and a control means associated therewith operable to a plurality of predetermined positions to condition said transmission for reverse drive, a low speed forward drive and a combined low and high speed forward drive which, together with certain control means, form the automatic transmission of the present invention.

A further object of the invention is to provide a power transmission system and control therefor in which either the battery or generator of the vehicle may be used as the source of power for energizing the electromagnetic means of the transmission.

A further object of the invention is to provide an improved power transmission system and control therefor in which the generator of the vehicle may be used as the source of power for energizing the electromagnetic means associated with both forward and reverse drive and in which the battery may also be used as a source of power for the reverse drive, whereby the battery can be used as an emergency source of power to render the reverse drive effective as a braking means if necessary and irrespective of the engine speed and generator voltage.

A further object of the invention is to provide an improved power transmission system comprising electromagnetically controlled gearing supplied with energy from a vehicle generator with a manually operable controller so arranged in circuit with the generator that the generator voltage may be reduced to decrease the power supplied to the electromagnetic means whereby the engine operates at increased speed and more power is transmitted therefrom to the driven shaft.

A still further object of the invention is to provide the vehicle generator with a control actuated by the vacuum developed by the engine whereby the value of the generated voltage is varied in response to the operative condition of the engine.

Other objects and advantages of the present invention will become apparent from the ensuing description, in the course of which reference is had to the accompanying drawings, in which:

As stated above, the power transmission of the present invention is, in its broader aspects, susceptible of various applications and the drive shaft 12 may be driven by any suitable prime mover such as a steam engine, electric motor, internal combustion engine, or the like. However, since the transmission is particularly adapted for use with automotive vehicles employing internal combustion engines and some of the more specific features of the invention are directed to the control of the transmission in such a vehicle, it will be assumed that the shaft 12 is driven by an automobile engine.

Figure 1:
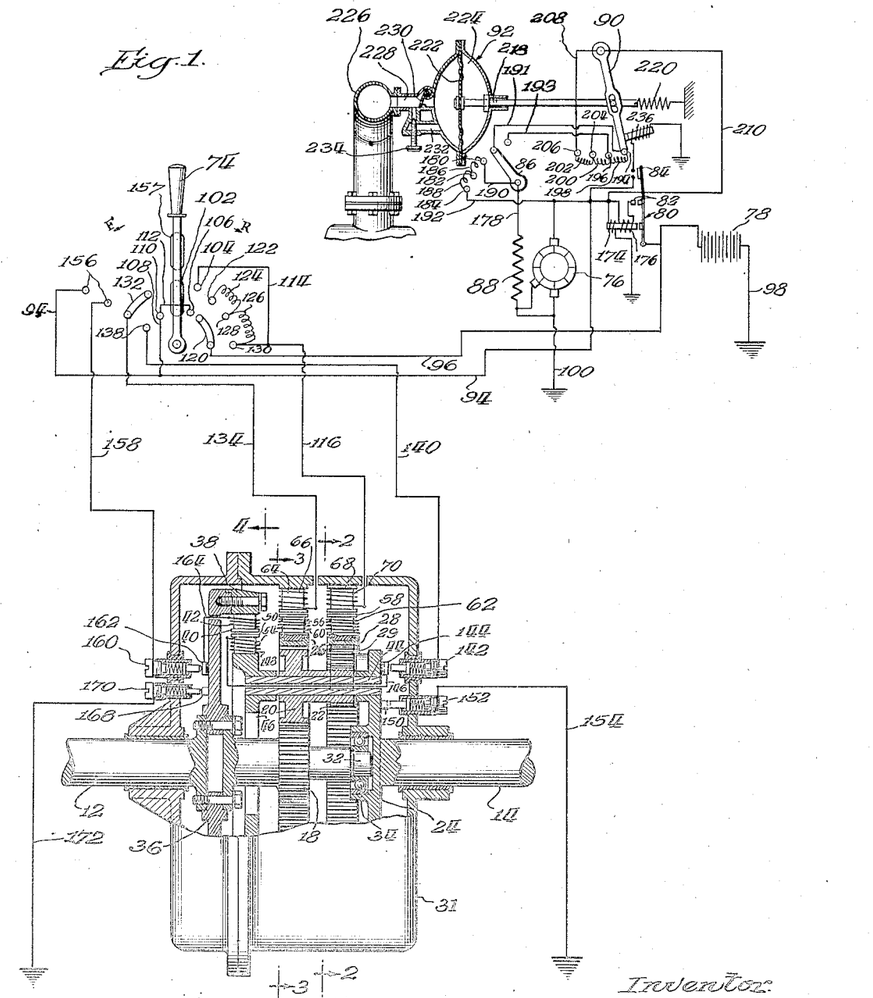
Fig. 1 is a diagrammatic representation of one embodiment of the power transmission and control of the present invention.

The drive shaft 12 is connected to a driven shaft 14 through gearing comprising a sun gear 18, a plurality of compound planetary gears 20, 22, a planet gear carrier 24, and a pair of ring gears 26 and 28 associated with gears 20 and 22, respectively. Ring gear 26 is in mesh with planet gears 20, which are of larger size than the planet gears 22. Ring gear 28 is in mesh with idler gears 29, which are rotatably supported by pins or shafts 30 fixedly mounted upon the planet carrier 24. Thus, if, and as is done in accordance with the present invention, the rotation of the ring gears is restricted when the sun gear 18 is rotating then, when the rotation of ring gear 26 is restricted, the driven shaft is rotated in one direction (forward) and when the rotation of ring gear 28 is restricted the shaft is rotated in the opposite direction (reverse).

The drive and driven shafts are journaled in and the gearing is housed within a transmission case 31 which may be suitably mounted upon the chassis of the automobile. A substantial support for the rear end 32 of the drive shaft is provided in the front end of the driven shaft by mounting a bearing 34 in the latter.

The sun gear 18 is shown as an integral part of the drive shaft which has bolted to flanges formed integral therewith an annular metallic plate 36 mounting a rotating field structure comprising a metal ring 38, a plurality of poles 40, and an equal number of series connected field coils 42 adapted to be energized when the combined high and low speed drive is rendered effective.

Figures 2, 3, 4:
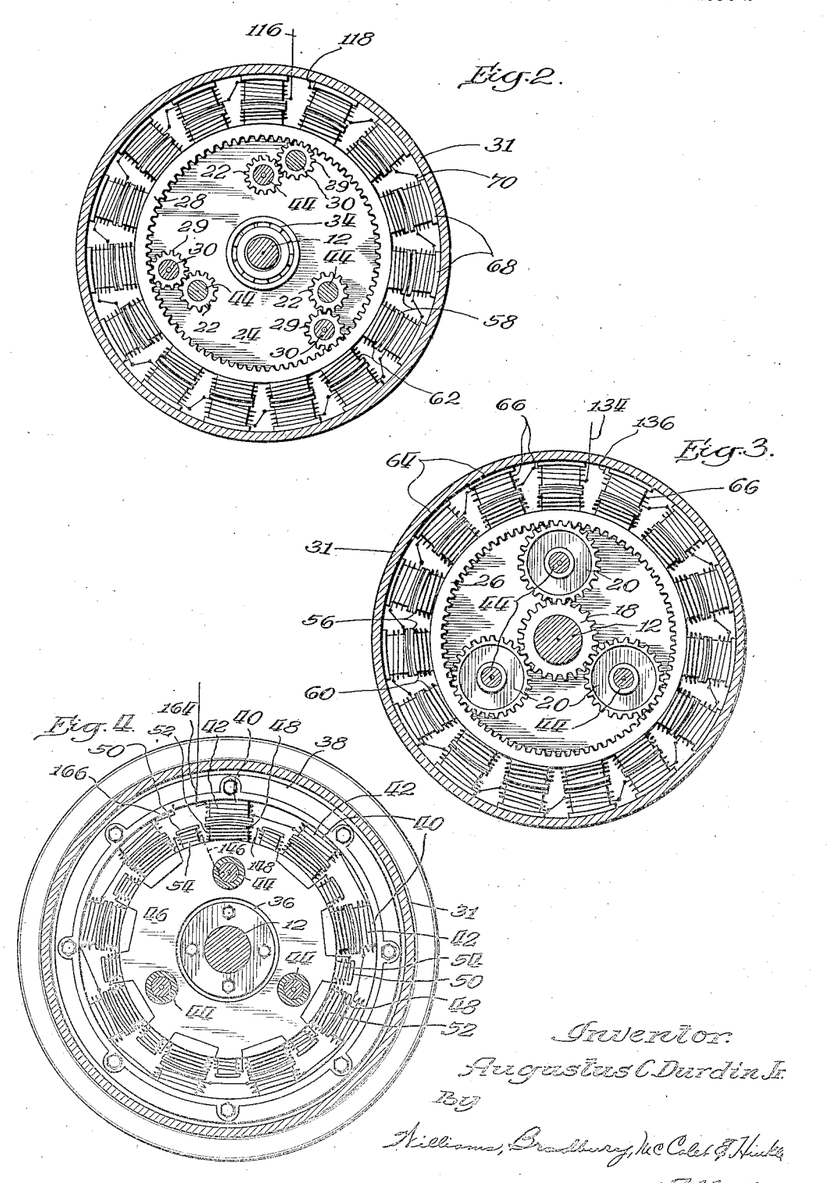
Fig. 2 is a transverse sectional view taken along the line 2—2 of Fig. 1 and showing the arrangement of gears and the electromagnetic means of the reverse drive.
Fig. 3 is a transverse sectional view taken along the line 3—3 of Fig. 1, and showing the arrangement of gears and the electromagnetic means of the low speed forward drive.
Fig. 4 is a transverse sectional view taken along the line 4—4 of Fig. 1 and showing the electromagnetic means of the high speed drive.

The planet gears 20, 22 are rotatably mounted upon three studs 44 fixedly mounted in the planet carrier 24 equidistant from each other. The studs 44 also carry a metal ring 46 upon which is mounted rotor and field structures forming part of the combined low and high speed drive and comprising, as best illustrated in Fig. 4, a plurality of poles 48 equal in number and similar in shape to the poles 40 upon the ring 38 and an equal number of smaller field poles 50 located between the poles 48. The poles 48 are spaced relatively far apart and are each provided with short circuited windings 52 and the poles 50 with series connected field coils 54. The short circuited windings are adapted to be influenced inductively by the rotating magnetic field resulting from the energization and rotation of field coils 42, whereby power is transmitted directly from the drive to the driven shaft. The series connected coils 54 are also influenced by the rotating magnetic field and a voltage is generated therein. The value of the voltage so generated is dependent upon the relative speed of rotation of the drive and driven shafts 12 and 14. This voltage is utilized in a novel manner to provide, together with other electromagnetic means and control to be described later, an automatic transmission. When the automatic transmission is rendered effective, the voltage is supplied to electromagnetic means associated with the low speed forward drive now about to be described.

The ring gears 26 and 28 are provided with rotor structures comprising poles 56 and 58 mounting short circuited windings 60 and 62, respectively, in inductive relation to a pair of fixed field structures. Ring gear 26 and its rotor structure has associated therewith a fixed field structure comprising poles 64 and series connected field windings 66. Ring gear 28 and its rotor structure has associated therewith a similar fixed field structure comprising poles 68 and series connected field windings 70. As shown best in Figs. 2 and 3, the poles 56 and 58 are similar in shape and equal in number to the poles 26 and 28, respectively.

The apparatus thus far described comprises what may be termed the power transmission proper. Under normal conditions the shaft 12 rotates in a predetermined direction at a speed determined by the throttle setting. With no energy being supplied to any of the field structures described above, the driven shaft 14 remains stationary, the sun gear 18 rotating only the planet gears 20, 22 and their associated ring gears 26 and 28, ring gear 26 rotating in one direction and ring gear 28 in the opposite direction because of the idler gear 29.

When it is desired to rotate the driven shaft 14 at low speed in the forward direction, the fixed field structure associated with ring gear 26 is energized. The field coils are wound so that the poles form alternate north and south poles and, as known to those skilled in the art, the resulting magnetic field retards the rotation of the ring gear by the induction principle, the amount of the retardation being dependent upon the degree of energization of the field coils. As soon as a retarding force is applied to the ring gear, a torque is applied to the driven shaft— and power is transmitted from the drive shaft 12 through sun gear 18, planet gears 20, 22, shafts 44, and planet carrier 24. The greater the retarding force and resulting retardation of the ring gear, the greater the speed of the driven shaft. The speed of the driven shaft thus varies with the speed of the drive shaft and also with the retardation of the ring gear. When the ring gear is stationary, the ratio of the speeds of the two shafts is dependent upon the ratios of the sun, planet and ring gears.

When it is desired to rotate the driven shaft in the reverse direction, the fixed field structure associated with ring gear 28 is energized. The rotation of ring gear 28 is retarded by the magnetic field set up by the field coils 70 which are also connected to form alternate north and south poles. Because of the inter-position of the idler gear 29 between the ring gear 28 and planet gear 22 and the smaller size of the latter, the maximum reverse speed of the driven shaft is less than its low forward speed.

An important feature of the present invention resides in the construction and mode of operation of that portion of the transmission called the combined low and high speed forward drive and which is utilized to provide an automatic transmission. This drive is a dual drive, that is, it operates both as a low speed and as a high speed drive. This mode of operation is effected by cooperatively associating the electromagnetic structure of the high speed drive, i. e., the field structure mounted upon rings 38 and 46, with the electromagnetic structure of the low speed drive, i. e., the field structure mounted upon ring 26 and its associated fixed field structure. The electrical circuits, to be described shortly are so arranged that, when high speed drive is desired, the voltage generating field coils on ring 46 are placed in series with the fixed field coils 66 and the field coils 42 are energized. The latter are also connected in series to form alternate north and south poles and, being mounted upon plate 36, are rotated at the same speed as shaft 12. The rotation of the field coils 42 produces two effects, as mentioned above. The first is a direct transmission of power from the drive shaft 12 to the driven shaft through the coaction of the magnetic field produced by rotation of coils 42 by the drive shaft with the short circuited coils 52 mounted upon poles 48 which are in turn mounted on the driven shaft. The second of the two effects is the generation of a voltage in the series connected field coils 54 effective to cause a flow of current through coils 66 which effects, in turn, a retardation of the rotation of ring 26. The voltage generated in the field coils 54 is of the alternating type having a magnitude and frequency dependent upon the relative speed of shafts 12 and 14. When the relative speed is greatest, i. e., when the shaft 14 is stationary, or substantially so, the frequency and magnitude of the generated voltage are greatest. When the magnetic drive becomes fully effective, no voltage is generated because the two shafts rotate at the same speed.

Thus, when starting under automatic transmission, the frequency and magnitude of the generated voltage are greatest. But at the higher frequencies, the reactance of the field coils is greatest and consequently the retardation of ring gear 26 by the alternating current flowing through the coils (which current, even though alternating in character, is effective to produce retardation of the ring gear, the same as unidirectional current) is reduced. This, as a matter of fact, is desirable as it decreases the shock of starting.

The combined effect is a transmission of power through the electromagnetic means comprising the rotor and field structures on rings 38 and 46 and through the mechanical means comprising the planetary gearing. As the speed of the driven shaft increases, the voltage generated in coils 54 gradually decreases, because of the decrease in relative speed between coils 42 and 54 and the fact that poles 50 are designed to operate substantially above magnetic saturation so that the voltage generated in coils 54 is substantially proportional to the relative speed.

After the drive shaft reaches a predetermined speed the electromagnetic drive becomes predominant and the driven shaft is driven directly by the drive shaft. Thereafter, when the speed increases still further to a predetermined value, the driven shaft is driven at the same speed as the drive shaft, i. e., the ratio of their speeds is 1:1. This results from the fact that the poles 40 rotated by the drive shaft and the poles 48 mounted on the driven shaft are spaced relatively far apart and from the fact that the field produced by the coils 42 mounted upon the former is sufficient magnetically to hold the latter in fixed relation thereto. It might be noted in passing that under these conditions the direction of rotation of ring gear 26 is reversed.

When the load becomes greater than can be transmitted through the electromagnetic coupling alone, the coils 54 again generate a voltage and power is transmitted both electromagnetically and mechanically as described above through the field and rotor structures on rings 38 and 46 and retardation of rotation of ring gear 26.

The control circuits and devices for the power transmission system form an important feature of the present invention, as will be apparent from the following description.

In order selectively to render effective the various electromagnetic means of the transmission there is provided a manually operable controller 74 preferably located within reach of the operator and movable into a plurality of predetermined positions. It is adapted to be moved clockwise into a plurality of positions to energize the fixed field winding 70 directly from the vehicle generator 76 or either directly or through selected resistors from the vehicle battery 78. The generator has been diagrammatically illustrated as being of the well known three brush type, but any generator having a relatively flat speed-voltage characteristic may be utilized. By supplying the generator field with current through selected resistors, the current flow through the field can be varied and the retardation of the ring gear 28 can be varied selectively to vary the power transmitted. The manual controller is movable counter-clockwise into either of two positions. In the first position the fixed field coils 66 of the low speed drive are energized by connection thereof to the generator and in the second, the rotating field coils 42 are similarly energized and the rotating field coils 54 and fixed field coils 66 connected in series.

Before describing the details of the circuit arrangement it may be well to mention the fact that the control system also comprises an automatic cut-out 80 provided with switches 82 and 84 adapted respectively to control the connection of the generator to the battery in response to generator charging voltage in customary manner and to control the generator field circuit through other control means to be mentioned shortly in such manner as to permit gradual increase in the power transmitted when the car is started and to prevent stalling of the engine when the car is being stopped, as will be described fully hereinafter. The control comprises also a manually operable controller arm 86 located, like controller 74, within reach of the operator and adapted to control the value of the resistance in circuit with the generator field 88 and the voltage generated by the generator. The controller 86 is utilized under certain conditions of operation when it is desired to reduce the generator voltage, such as when the engine is pulling a heavy load and the engine speed is not sufficient to develop the necessary power. Under these conditions the generator voltage can be reduced to decrease the retardation of one of the ring gears, thereby permitting the engine to operate at an increased speed so that it can develop more power. The controller can likewise be utilized when the car is proceeding under its own momentum, as when it is going down hill. If the generator voltage is sufficient to prevent the car from traveling as fast as desired, the voltage can be decreased to effect a decrease in the retardation, and thus, an increase in vehicle speed.

The control comprises also a controller 90 adapted to be actuated in response to the vacuum developed by the engine by means indicated generally by reference numeral 92 and adapted to control a resistance in circuit with the generator field 88. The purpose of this controller is to provide a means acting in cooperation with cut-out 80 adapted to permit a gradual increase in the power transmitted as the car is started, thereby to prevent jerking of the car, and likewise to prevent stalling as the car is being stopped.

It is believed that the detailed description of the control can be simplified by noting that the transmission is supplied with electrical energy, under the control of controller 74, from the positive terminal of the battery through a conductor 96 and from the positive terminal of the generator through a conductor 94. In accordance with usual custom, the negative terminals of the battery and generator are grounded through conductors 98 and 100.

When the controller 74 is actuated into its first clockwise position, i. e., its reverse position, a contact 102 mounted thereon bridges a pair of contacts 104 and 106, thereby connecting the field coils 70 to the generator. The circuit extends from the generator to the coils through conductor 94, contact 110, conductor 112, contacts 104, 106, and 102, and conductors 114 and 116. The circuit is completed through ground by conductor 100 and a ground connection 118 shown in Fig. 2.

When the controller is actuated into its second clockwise position, i. e., its low speed reverse position, the field coils 70 are energized at a low current value by connection thereof directly to the battery. The circuit extends to the coils from the battery through the conductor 96, a segment contact 120, contact 122, resistors 124 and 126 and conductor 116. The circuit is completed by the ground conductors 98 and 118.

When the controller is actuated to its third clockwise position, i. e., its intermediate speed reverse position, the resistor 124 is cut out by connection of terminal 128 to the segment contact by contact 102 and when it is actuated to its last position, in which contact 102 engages contact 130, the field is connected directly to the battery for high speed reverse operation.

As explained above, there are two forward drive positions, the first being a low speed drive position and the second a combined low and high speed drive, or automatic transmission position. In the first of these two positions the contact 102 bridges contact 110 and a segment contact 132 thereby to connect the field coils 66 to the generator. The circuit from the generator to the coils extends through conductors 94 and 108, contact 110, 102 and 132, and conductor 134. The circuit is completed by ground conductors 100 and 136 (see Fig. 3).

In the second forward position the field coils 54 and 66 are connected in series and field coils 42 to the generator. The series connection of the two sets of field coils is made through a circuit consisting of ground connection 136, field coils 66, conductor 134, segment contact 132, contacts 102 and 138, conductor 140, a spring biased and insulated brush structure 142, a slip ring 144 insulated from and mounted upon the planet carrier plate 24, a conductor 146 extending through an opening in one of the planet carrier shafts 44, field coils 54 and a ground connection including conductor 148, a slip ring 150, a brush structure 152, and conductor 154 (see Figs. 1 and 4). The connection of field coils 42 to the generator is made through conductor 94, contacts 156 and 157, conductor 158, insulated brush structure 160, an insulated slip ring 162 mounted on plate 36, conductor 164, field coils 42, and a ground connection including conductor 166, slip ring 168, brush structure 170 and conductor 172.

Returning now to the detailed description of the generator control, it may be seen that the automatic cut-out 80 comprises the usual potential coil 174 connected across the generator terminals and a series connected current coil 176 adapted to separate contacts 82 upon a reverse flow of current resulting when the generator voltage drops as a consequence of the decrease in motor speed. The cut-out is so constructed and arranged with respect to the remainder of the control that it will cut out before the engine idling speed is reached and will cut in only after the engine speed reaches a value at which the generator voltage is above a predetermined value. In the instant case the generator voltage is controlled in response to the engine vacuum so that this predetermined value is not reached until after the duration of a period of time in which the car has had a chance to be accelerated gradually.

As stated previously, the value of the generated voltage may be controlled by the manually operable controller 86 or the vacuum operated controller 90. The manual controller is connected to one terminal of the field 88 through a conductor 178, the other terminal of the field being connected in obvious manner to the third brush of the generator. The controller is illustrated as being operable into engagement with contacts 180, 182 and 184 associated with resistors 186 and 188 connected by conductors 190 and 192 to the controller and the positive terminal of the generator, respectively. It is also operable into the engagement with a pair of contacts connected by conductors 191 and 193 to a pair of contacts 194 and 196 connected to the terminals of a resistor 198 forming together with resistors 200 and 202 and controller 90 a means for varying the generator field strength in response to the rate of decrease of the vacuum. The latter resistors have associated therewith contacts 204 and 206 adapted, like contacts 194 and 196, to be contacted by the controller.

The circuit connections are completed by conductors 208 and 210 leading from controller 90 to contact 206 and to the positive terminal of the generator, respectively. The circuit arrangement, as will be recognized by those skilled in the art, in such that, with the controller 86 in its illustrated position, i. e., its normal position when the vacuum operated control is being used, the movement of controller 90 to the left increases the total field resistance and the movement to the right decerases it. Thus, the generator voltage is a maximum when the controller 90 is in its illustrated position and a minimum when it is in its extreme left position. The controller 90 occupies the indicated position when the engine is not rotating and after the engine has been operated to a speed above its idling speed sufficient to increase the generator voltage to a predetermined value and sufficient time has elapsed for the vacuum to decrease to a low value at a predetermined rate, as now about to be described.

The controller 90 is controlled in response to an operating characteristic of the engine, in this case the vacuum developed by the engine. More specifically, it is controlled not only by the vacuum, but also the rate in decrease in vacuum so that it moves to its indicated position only after the engine has attained a sufficient speed and sufficient time has elapsed for the increase of generator voltage to the value at which the cut-out closes its associated switches 82 and 84 Means are also provided to vary the rate of the decrease of the vacuum to give a further control over the time it takes for the controller to move between its two positions. Once the controller moves to the left it is kept there until the motor speed reaches a predetermined value above its idling speed.

The controller is actuated by an arm 218 biased to its right by a spring 220 and moved in its opposite direction when the vacuum increases above a certain value by a diaphragm 222 mounted in a sealed chamber 224. One side of the chamber is connected to the engine intake manifold 226 by a passage 228 having mounted therein a flap valve 230 adapted to open when the vacuum in the manifold exceeds that within the chamber.

The rate of decrease of vacuum within the chamber is controlled by means of a bleeder passage 232 and a manually operable valve 234 which may be opened to increase and closed to decrease the rate.

A solenoid 236 adapted to be connected across the generator by the cut-out 80 by means of switch 84 is utilized to hold the controller 90 in its illustrated position. As explained above and will be amplified in the description of the operation, the cut-out closes this switch upon an increase in voltage to a predetermined value and opens it upon a decrease in the voltage to a value higher than that obtaining when the engine is idling.

The advantages of the present power transmission and its associated control may be better understood from a consideration of the operation thereof as a whole.

Under normal conditions, with the engine inoperative, the apparatus occupy the positions indicated. The manually operable transmission controller 74 is in its central or neutral position, the manually operable generator field controller is in engagement with conductor 191, and the vacuum operated controller in engagement with contact 194 and, therefore with conductor 191. The cut-out 80 is open so that solenoid 236 is deenergized and the battery disconnected from the generator.

It is assumed that an operator enters the vehicle and desires to move the car in a reverse direction and at a slow speed. He first moves the manually operable controller into engagement with contacts 102 and 104, connecting the fixed field coils of the reverse drive of the transmission to the generator terminals through a circuit previously described. He then starts the car and the vacuum is increased and the controller 90 actuated to its extreme left position. It will be remembered this is possible because solenoid 236 is deenergized as a result of the fact that the generator voltage is not sufficient to close the cut-out 80 at idling speed. The operator then opens the throttle, thereby decreasing the vacuum and increasing the speed. The vacuum within the diaphragm chamber 224 decreases at a rate determined by the setting of bleeder valve 234. The gradual decrease in vacuum enables the spring 220 gradually to operate the controller to the right. This in turn effects a gradual increase in the generator voltage until after a certain time it reaches a value at which the cut-out is effective to close its associated switches. Closure of switch 84 results in the energization of solenoid 236 and the maintenance of controller 90 in its indicated position until after the motor speed reaches a low value just above its idling speed.

The gradual increase in generator speed effects a gradual increase in the current flowing through field coils 70 and resistors 124 and 126. As a result, the retardation of the ring gears by the magnetic field set up by coils 70 is effected gradually. Consequently, the vehicle is started in motion in a reverse direction gently, just as it would be if the usual foot operated clutch was eased in gradually.

Once the car has been started, and in view of the flat speed-voltage characteristic of the generator, any variations in throttle setting will have relatively no effect upon the transmission system, in so far as the retarding force is concerned, but increased motor speed will effect an increase in the speeds of both the driving and driven shafts. This may be noted from a consideration of the operation with the ring gear stationary. When the ring gear is stationary, the ratio of the speeds of the drive and driven shafts is fixed, but the speed of the latter is dependent upon the speed of the former.

When it is desired to stop the car in its reverse movement, the operator needs only to close the throttle. The resulting decrease in motor speed effects a decrease in generator voltage and when the voltage reaches a value that occurs at a speed slightly above the idling speed (and which is substantially a fixed value because of the fact that the resistances 194, 196 and 202 are cut out of circuit and controller 90 remains stationary), the cut-out opens. This effects the deenergization of solenoid 236 and an immediate reduction in voltage and transmission of power. The car may then be braked by the usual foot brake (not shown) or electrically by operating the controller into a forward drive position, as will be explained shortly.

As brought out above, the car may be driven in a reverse direction by operating the manual controller 74 to its second, third or fourth clockwise position, in which variable currents are supplied to the field coils 70 from the battery. When so operated the field is energized substantially immediately and not gradually as described above, although a limited gradual increase in speed may be obtained by operating the controller successively over the three positions mentioned thereby to vary the retarding force exerted upon the ring gear. However, it is not essential that the energization be gradual and this is true particularly of the described arrangement, the primary purpose of which is to provide an emergency electrical braking means that is operable in case of generator failure when traveling at relatively high speeds in a forward direction. It may be seen that upon such an occurrence the controller 74 could be moved into any of the three positions mentioned to effect a braking operation. Before proceeding with the description of the operation when the car is driven in a forward direction it might be well to mention that more resistances could be used in place of resistances 124 and 126 illustrated to obtain a more gradual starting and a greater number of reverse speeds. Braking may be effected in the manner described above when it is desired to stop the car after it has been moved according to the operation just described.

Assume now that the operator wishes to start in a forward direction from standstill and that he is in a locality where he must start and stop frequently, as in heavy traffic. Under these conditions he would operate controller 74 into its first counter-clockwise position, in which the fixed field coils 66 of the low speed forward drive are connected to the generator as described in detail above. He next starts the car and then opens the throttle. This effects gradual actuation of controller 90 to the right, as described in connection with the reverse drive, and a gradual increase in generator voltage until, after a certain period of time, the generator voltage is sufficient to close the cut-out. The gradual increase in voltage effects a gradual retardation of ring gear 26 and a gradual starting of the car. The rate of decrease of the vacuum, which it may be remembered was controlled by the setting of the bleeder valve 234, and the resistances 198, 200, and 202 are so designed that the car will have attained substantially full speed by the time the cut-out closes. It should be noted in this connection that the number and value of resistances may be varied to suit the circumstances of a particular installation. After the cut-out closes the car can be operated at varying speeds by varying the setting of the throttle, the attendant variations in vacuum not substantially affecting the electromagnetic means of the transmission until after the engine speed reaches a value slightly above its idling speed, all as explained in connection with the description of operation of the drive in the reverse direction when utilizing the vehicle generator.

When it is desired to stop the car it is necessary only to close the throttle, thereby decreasing the voltage generated until the cut-out 80 opens. Thereafter the car can be braked by a foot brake or by rendering effective the reverse drive by connection of field coils 70 to either generator or battery. It should be noted that in case of failure of the generator, the battery can be used as an emergency source of power to render the reverse drive effective as a braking means. It might be noted also that the generator would usually be used because the operator, usually using the generator in the forward drive, is more accustomed to operation therewith. If the forward speed is to be checked while the car is moving rapidly and the engine is turning rapidly, then the cut-out 80 would be closed and braking would be effected immediately at maximum power.

When the operator is starting up and he is in a locality where he can go directly into high speed, he can operate controller 74 into its second clockwise position. It may be remembered that in this position the rotatable field coils 42 are connected to the generator and the rotatable field coils 54 are connected in series with the fixed coils 66. The voltage supplied to coils 42 gradually increases, as explained above, after the throttle is opened and the increasing magnetic field created thereby effects the direct rotation of the driven shaft by action upon the poles 48 which carry the short circuited coils 52 and also the generation of a voltage in coils 54. This voltage is a maximum at standstill, but as soon as the driven shaft starts to rotate it decreases, and it continues to decrease with increase in speed of the driven shaft. Consequently, power is initially transmitted to the driven shaft both electromagnetically and mechanically. After the speed thereof increases to a value above that which obtains with ring gear 26 stationary, the latter reverses its direction of rotation and all the power is transmitted to the driven shaft through the electromagnetic means. After the speed further increases the magnetic field set up by coils 42 is strong enough so that the driven shaft is rotated in unison with the drive shaft, so that their speed ratio is 1:1. Thereafter the drive is a "direct drive" and the speed of the driven shaft is equal to and varies with that of the drive shaft. All the above described steps in the operation of the drive take place while the generator voltage is increasing to the value at which the cut-out closes so that the car gradually accelerates from standstill to a high speed.

It is possible to go from the low forward speed to the high speed simply by operating the controller to its second counter-clockwise position after the car has reached its maximum low speed. Inasmuch as the generator is developing its maximum voltage when such a change is made, the result is a rapid acceleration of the car and not the gradual one described above.

Whenever the car is running at high speed and the load increases to a value such that slippage occurs between the drive and driven shafts, a voltage is generated in the coils 54 and power is again supplied to the driven shaft through both the electromagnetic means and the gearing.

When it is desired to stop the car after operation at high speed, this can be accomplished in the previously described manner through electrical or mechanical braking.

In some instances the load increases to a value such that the engine is slowed down to such an extent that it cannot develop the required power. In this case the retarding force exerted upon the ring gears can be decreased so as to permit an increased slip and a higher motor speed simply by operating the controller 86 into engagement with contact 180. This results in the connection of resistors 186 and 188 in series with generator field 88 and a decrease in voltage. The reduction in generator voltage effects a reduction in the strength of the magnetic field developed by the fixed field coils and lessens the force retarding the rotation of the ring gears. The controller 86 can be operated into contact with contacts 182 and 184 to increase the generator field strength and likewise into engagement with conductor 192.

The manual controller 86 may also be utilized when the car is going down hill under its own momentum. If the voltage generated under these conditions is sufficient, with the controller 74 in its low speed forward position, to hold the ring gear 26 substantially stationary, then the car speed would be too low. To increase it, it is necessary only to weaken the generator field to permit an increased slip or rotation of the ring gear.

The present invention is applicable to vehicles other than an automobile and some of its features are applicable to power transmission systems in general. For instance, it could be applied to a system utilizing a constant speed driving motor and not having a variable generator as a part thereof. Under these conditions batteries or other sources of energy could be utilized in the operation. Other applications and modifications may readily suggest themselves to those skilled in the art and it is contemplated that the invention is in nowise limited by the specific embodiment described above.

Having thus described my invention, what I claim as new and desire to secure by Letters Patent of the United States is:

1. A power transmission system including in combination, a drive shaft, a driven shaft, constantly meshing gears including planetary gearing and a ring gear carried by the planet gears thereof interconnecting the two for mechanical transmission of power, a magnetic field producing structure comprising a predetermined number of field poles of relatively large size and having coils connected to form alternate north and south poles rotated by said drive shaft, electromagnetic means comprising an equal number of relatively small size field poles having coils connected to form alternate north and south poles and an equal number of poles substantially equal in size to said first mentioned poles having short circuited windings and mounted alternately with respect to said small size poles for rotation with said driven shaft, a plurality of poles having short circuited windings mounted upon the ring gear, a plurality of field poles having coils connected to form alternate north and south poles and fixedly mounted so as to influence the poles mounted upon said ring gear, and a circuit connecting in series the fixed and rotating series connected coils.

2. A power transmission system including in combination, a drive shaft, a driven shaft, constantly meshing gears including planetary gearing and a ring gear, the rotation of which may be retarded, interconnecting the two shafts, electromagnetic means for effecting retardation of said ring gear whereby power may be transmitted mechanically from the drive shaft to the driven shaft, a magnetic field producing structure rotated by said drive shaft, electromagnetic means mounted for rotation with the driven shaft comprising structure inductively associated with said field producing structure for directly rotating said driven shaft and other structure influenced by said field producing structure for generating a voltage, a source of energy, and manually operable means for selectively connecting said source to said retarding means or for simultaneously connecting said source to said magnetic field structure and supplying the generated voltage to said retarding means.

3. A power transmission system including in combination, a drive shaft, a driven shaft, constantly meshing gears including planetary gearing and a pair of ring gears mounted thereon for rotation in opposite directions interconnecting said shafts, electromagnetic means associated with each of said ring gears for effecting retardation thereof whereby power may be transmitted mechanically from the drive to the driven shaft to drive the latter in forward and reverse directions, a magnetic field producing structure rotated by said drive shaft, electromagnetic means mounted for rotation with the driven shaft comprising structure inductively associated with said field producing structure for directly rotating said driven shaft and other structure influenced by said field producing structure for generating a voltage, a source of energy, and a manually operable controller operable into a first predetermined position to condition said system for rotation of the driven shaft in the reverse direction by connecting one of said retarding means to the source of energy, into a second position to condition said system for rotation of the driven shaft through said gearing in the forward direction at low speeds by connecting the other of said retarding means to the source of energy, and into a third position to condition said system for rotation of the driven shaft in the forward direction first at lower speeds through both electromagnetic means and gearing and then at higher speeds through the electromagnetic means by simultaneously connecting the field producing structure to the source and supplying the generated voltage to said other retarding means.

4. In an automotive vehicle, the combination including, an internal combustion engine, a power transmission comprising planetary gearing connecting the drive shaft to the driven shaft, a ring gear rotatably supported thereby and electromagnetic means for retarding rotation of the ring gear, a variable voltage source of electrical energy for said electromagnetic means, and means responsive to an operating characteristic of the engine for controlling the rate of increase of the voltage of said source.

5. In an automotive vehicle, the combination including, an internal combustion engine, a power transmission including electromagnetic means adapted variably to be energized for transmitting power from the drive shaft to a driven shaft of the vehicle and the energization of which is adapted gradually to be strengthened gradually to start and accelerate said driven shaft, a variable voltage source of electrical energy for energizing said electromagnetic means, and means responsive to the vacuum developed by said engine for gradually increasing the voltage of said source, thereby gradually to strengthen the energization of said electromagnetic means.

6. In an automotive vehicle, the combination including, an internal combustion engine, a power transmission including electromagnetic means adapted variably to be energized for transmitting power from the drive shaft to a driven shaft of the vehicle and the energization of which is adapted gradually to be strengthened gradually to start and accelerate said driven shaft, a variable voltage source of electrical energy for energizing said electromagnetic means, means responsive to the rate of decrease in vacuum developed by the engine for gradually increasing the voltage of said source, thereby gradually to strengthen the energization of said electromagnetic means, and means for varying the rate of decrease of the vacuum whereby the rate of acceleration of the driven shaft may be controlled.

7. In an automotive vehicle, the combination including, an internal combustion engine, a power transmission including electromagnetic means adapted variably to be energized for transmitting power from the drive shaft to a driven shaft of the vehicle, a variable voltage generator driven by the engine, means connecting said generator to said electromagnetic means, means responsive to the vacuum developed by the engine for gradually increasing the voltage as the vacuum decreases, and means responsive to the generator voltage controlling said last mentioned means.

8. In an automotive vehicle, the combination including, an internal combustion engine, electromagnetic means adapted variably to be energized for transmitting power from the drive shaft to a driven shaft of the vehicle, a variable voltage generator driven by the engine and comprising a field winding and resistance means in circuit therewith, a circuit connecting the output of the generator to said electromagnetic means, means including a controller actuated in response to the vacuum developed by the engine for controlling said resistance, said means being so constructed and arranged that the resistance is gradually decreased as the vacuum decreases, and means responsive to generator voltage adapted to hold said controller in a predetermined position upon attainment of a predetermined voltage and until the voltage decreases to a predetermined minimum value.

9. In an automotive vehicle, the combination including, an internal combustion engine, electromagnetic means adapted variably to be energized for transmitting power from the drive shaft to a driven shaft of the vehicle, a variable voltage generator driven by the engine and comprising a field winding and resistance means in circuit therewith, a circuit connecting the output of the generator to said electromagnetic means, means including a controller actuated in response to the vacuum developed by the engine for controlling said resistance, said means being so constructed and arranged that the resistance is gradually decreased as the vacuum decreases, and means responsive to generator voltage adapted to hold said controller in a predetermined position upon attainment of a predetermined voltage and until the voltage decreases to a predetermined minimum value, said last mentioned means including an automatic cut-out responsive to generator voltage and charging current and a solenoid whose energizing circuit is controlled thereby and adapted to hold the controller in its minimum resistance position until it is deenergized.

10. In an automotive vehicle, the combination including, an internal combustion engine, electromagnetic means adapted variably to be energized for transmitting power from the drive shaft to a driven shaft of the vehicle, a variable voltage generator driven by the engine, and having its output connected to said electromagnetic means, means responsive to an operating characteristic of the engine for controlling the value of the voltage generated by said generator during initial acceleration of the vehicle, and manually operable means for controlling the value of the generated voltage after such initial acceleration.

11. In an automotive vehicle, the combination including, an internal combustion engine, electromagnetic means adapted variably to be energized for transmitting power from the drive shaft to a driven shaft of the vehicle, a variable voltage generator driven by the engine and having its output connected to said electromagnetic means, means responsive to an operating characteristic of the engine for controlling the value of the voltage generated by the generator, and manually operable means associated with the generator for controlling the value of the generated voltage and for rendering ineffective said last mentioned means to exert control over the generator.

12. In an automotive vehicle, the combination including, an internal combustion engine, electromagnetic means adapted variably to be energized for transmitting power from the drive shaft to a driven shaft of the vehicle, a variable voltage generator driven by the engine and connected to said electromagnetic means, first and second resistance means adapted to be placed in circuit with the generator, said second mentioned resistance means being adapted to decrease the generator voltage, means operable gradually to decrease the value of the first resistance means in circuit with the generator for gradually increasing the value of the voltage generated thereby in response to the rate of the decrease of vacuum developed by the engine, and manually operable means for selectively placing said resistance means in circuit with the generator, whereby the energization of said electromagnetic means can be gradually and automatically strengthened as the vacuum decreases and the vehicle starts when said first mentioned resistance means is placed in circuit and the energization of said electromagnetic means can be weakened when said second mentioned resistance is placed in circuit with the generator.

13. In an automotive vehicle, the combination including, an internal combustion engine, electromagnetic means adapted variably to be energized for transmitting power from the drive shaft to a driven shaft of the vehicle, a variable voltage generator driven by the engine and connected to said electromagnetic means, means responsive to the rate of decrease in the vacuum developed by the engine for increasing the value of the generator voltage, said means including a device responsive to the rate of decrease of vacuum, a resistance in circuit with the generator and a controller operable by said device from a first to a second position gradually to decrease the resistance from a maximum to a minimum value, and means responsive to the generator voltage and operable at a predetermined voltage for maintaining said controller in its second position and for releasing said controller when the voltage decreases below a predetermined value, the two last mentioned means being so constructed and arranged that the controller does not reach its second position and the last mentioned means is not effective to maintain the controller in said position until the vehicle has reached a substantial speed and the voltage is in excess of that generated at the engine idling speed and the controller is released only when the engine speed has decreased to a value slightly above the idling speed, whereby the power transmission is gradually rendered fully effective and also prevented from stalling the engine.

14. In an automotive vehicle, the combination including, an internal combustion engine, a power transmission including a pair of electromagnetic means adapted to be energized for transmitting power from the drive shaft to a driven shaft of the vehicle, a source of electrical energy for said means driven by the engine, a second source of energy for said means, and means operable selectively to connect either of said means to one of said sources and to connect one of said means to both said sources, whereby one source can be used as an emergency source for one of said means.

15. In an automobile vehicle, the combination including, an internal combustion engine, a power transmission system including a pair of electromagnetic means adapted to be energized for transmitting power from a drive to a driven shaft, one of said means being arranged to render said transmission effective to drive the vehicle in the forward direction at one speed and the other in reverse direction at a lower speed, a source of electrical energy for said means including a generator driven by the engine, a battery, and selectively operable means for connecting said first electromagnetic means to the generator and said second electromagnetic means to either the generator or battery.

16. In an automotive vehicle the combination including an engine, a drive shaft driven thereby, a driven shaft, means including electromagnetic means, the energization of which is adapted gradually to be strengthened gradually to accelerate the vehicle, and gearing interconnecting the shafts for transmitting power from one to the other, a generator driven by said engine adapted to be connected to said electromagnetic means, and means controlled in response to an operating characteristic of the engine for gradually and automatically increasing the generator voltage, said last mentioned means and the electromagnetic means being so constructed and arranged with respect to the generator that the transmission is rendered substantially fully effective when the voltage reaches a predetermined value.

17. A power transmission system, including in combination, a drive shaft, a driven shaft, constantly meshing gears including planetary gearing and a ring gear interconnecting said shafts, fixed electromagnetic means adapted to be supplied with energy for effecting retardation of said ring gear whereby power may be transmitted mechanically from the drive shaft to the driven shaft, a magnetic field producing structure rotated by the drive shaft, electromagnetic means mounted for rotation with the driven shaft comprising structure inductively associated with the field produced by said structure for directly rotating said driven shaft and other structure influenced by said field for generating a voltage, and means for supplying the generated voltage to the electromagnetic means retarding said ring gear.

18. A power transmission system, including in combination, a drive shaft, a driven shaft, constantly meshing gears including planetary gearing and a ring gear interconnecting said shafts for mechanical transmission of power, electromagnetic means mounted for rotation with said drive and driven shafts whereby the driven shaft is first rotated at gradually increasing speeds and then at substantially the same speed, said means including field producing structure rotatable with the drive shaft, voltage generating means and inductively actuated means mounted for rotation with said driven shaft located in the field produced by the structure rotatable with said drive shaft, and means including a fixed field producing structure to which said voltage generating means is connected and a plurality of field poles with short-circuited windings on said ring gear for retarding rotation of the ring gear for aiding in gradually increasing the speed of the driven shaft.

19. A power transmission system, including in combination, a drive shaft, a driven shaft, a plurality of alternately placed relatively large field poles with short-circuited windings and relatively small field poles with series connected windings on said driven shaft, and magnetic field producing structure comprising poles of relatively large size and windings connected to form alternate north and south poles on the drive shaft located concentrically with respect to the poles on the driven shaft, said shafts being rotatable with respect to each other whereby when the drive shaft is rotated power is transmitted directly to the driven shaft and a voltage proportional to the relative speed of rotation of said shafts is generated in said series connected windings.

20. A power transmission system including in combination, a drive shaft, a driven shaft, electromagnetic means mounted upon said driven shaft including a plurality of spaced-apart series connected coils and separate induction rotor defining structure, electromagnetic field producing means mounted upon said drive shaft, a source of energy for said last mentioned means, said last mentioned electromagnetic means acting directly upon said coils and rotor defining structure so that when it is energized and rotated power may be transmitted directly from the drive shaft to the driven shaft through said rotor defining structure and a voltage proportional to the relative speeds of rotation of said shafts generated in said coils, and means including a winding connected to said coils for effecting mechanical transfer of power from said drive shaft to said driven shaft.

21. A power transmission system including in combination, a drive shaft, a driven shaft, electromagnetic means comprising an induction rotor defining structure and voltage generating means mounted upon said driven shaft, electromagnetic field producing means mounted upon said drive shaft and a source of energy for said last mentioned means, said last mentioned electromagnetic means acting directly upon the first so that power may be transmitted directly from the drive shaft to the driven shaft through said rotor defining structure and a voltage generated in said voltage generating means, and means including a winding connected to said voltage generating means for effecting mechanical transfer of power from said drive shaft to said driven shaft.

AUGUSTUS C. DURDIN, Jr.